United States Patent [19]

Suzuki

[11] Patent Number: 5,366,229
[45] Date of Patent: Nov. 22, 1994

[54] SHOOTING GAME MACHINE
[75] Inventor: Kenzi Suzuki, Odawara, Japan
[73] Assignee: Namco Ltd., Tokyo, Japan
[21] Appl. No.: 61,589
[22] Filed: May 17, 1993
[30] Foreign Application Priority Data May 22, 1992 [JP] Japan .................. 4-156092

[51] Int. Cl.⁵ ........................ A63F 9/22; F41G 3/26
[52] U.S. Cl. ............................... 273/310; 273/311; 273/312; 434/20; 434/21; 434/22
[58] Field of Search ............... 273/310–316; 364/410; 434/16–23

[56] References Cited

U.S. PATENT DOCUMENTS

| | | | |
|---|---|---|---|
| 4,456,262 | 6/1984 | Palman | 273/358 |
| 4,611,993 | 9/1986 | Brown | 434/21 |
| 4,657,511 | 4/1987 | Allard et al. | 434/20 |
| 4,680,012 | 7/1987 | Morley et al. | 434/22 |
| 4,812,828 | 3/1989 | Nishi et al. | 273/312 X |
| 4,948,371 | 8/1990 | Hall | 434/21 |
| 5,194,006 | 3/1993 | Zaenglein, Jr. | 434/19 |
| 5,215,465 | 6/1993 | Marshall et al. | 434/22 |
| 5,248,150 | 9/1993 | Koma | 273/313 |
| 5,310,192 | 5/1994 | Miyake | 273/310 |

*Primary Examiner*—Jessica J. Harrison
*Assistant Examiner*—Kerry Owens
*Attorney, Agent, or Firm*—Oliff & Berridge

[57] ABSTRACT

In a shooting game machine, a projector projects a shooting video image, in which a target appears, on a screen. A player may fire a laser gun to emit a light beam to the target on the screen. A video camera photographs the screen, irrespective of any display scanning of the projector, and outputs its picture signal to coordinate computing means. The coordinate computing means counts clock pulses, which are output from a pulse generator, during a period from when a vertical synchronous signal of the picture signal is output until a beam point signal is output, and divides the count value by a predetermined reference pulse number to compute and output the X coordinate and the Y coordinate of the beam point on the screen.

20 Claims, 3 Drawing Sheets

SHOOTING GAME MACHINE

BACKGROUND OF THE INVENTION

1. Field of the Invention

This invention relates to a shooting game machine, and more particularly to a shooting game machine for shooting a target using a light beam.

2. Description of the Related Art

Conventionally shooting game machines are known which employs a light beam gun or the like. This conventional type shooting game machine is disclosed in Japanese Patent Laid-Open Publications Nos. Sho 50-72515, Sho 60-179079 and Hei 4-51987.

In this conventional art, the light beam gun is fired at a screen on which a target is displayed, and an impact position of the light beam is photographed using a video camera. It was however impossible to locate the impact position of the light beam precisely and simply.

For example, in the shooting game machine of Japanese Patent Laid-Open Publication No. Sho 50-72515, the impact position of the light beam gun is projected on a predetermined target board via a half-transmissive mirror, and this impact position is photographed by the video camera and is displayed on a display storage tube. A target described on the target board is superimposed on the screen of the display storage tube via the half-transmissive mirror, thereby synthesizing an image of a bullet mark, which represents the impact position, with the target. In this conventional machine, the impact beam point of the light beam gun is only photographed by the video camera, and no impact position is detected.

In the shooting game machine of Japanese Patent Laid-Open Publication No. Sho 60-179079, a shooting video image, in which a predetermined target appears, is projected on a screen using a projector, and the player may shoot the projected target by a light beam gun. The impact position is detected by photographing the screen by a video camera, and discrimination is made as to whether the shot has hit the target or has missed the target.

However, in this conventional machine, the image displaying operation of an image forming CRT mounted in the projector and the photographing operation of the television camera for photographing the screen have to be perfectly synchronized. A picture signal output from the television camera for its every horizontal scanning is compared with a target position display signal, which is read from a ROM in synchronism with the horizontal scanning, by a comparator to discriminate whether or not the beam point of the light beam gun is within the display area of the target, thereby detecting whether the shot has hit or missed the target. Thus, in this conventional machine, since the camera and the CRT have to be perfectly synchronized with each other in order to detect the impact position of the light beam gun, the setting-up therefor is meticulous.

In particular, since the output signal of the video camera and the impact position display signal, which is read from the ROM storing video information, have to be compared, for every horizontal scanning, in order to discriminate whether or not the shot has hit the target, it requires a complicated and expensive circuit.

Japanese Patent Laid-Open Publication No. Hei 4-51987 discloses the concept of displaying the entire screen using a CCD camera and detecting the impact position of the light beam gun based on a signal output from the CCD camera, but is totally silent about how to detect the impact position.

SUMMARY OF THE INVENTION

In view of the foregoing conventional problems, it is an object of this invention to provide a shooting game machine in which when the player fires a shooting means to emit a light beam to a predetermined target projected on a screen, the impact position of the light beam can be detected simply and precisely, based on a picture signal output from a photographing means, with no necessity of synchronizing a projector, for projecting a shooting video image on the screen, with the photographing means, for photographing the screen.

According to the invention, there is provided a shooting game machine comprising:

(a) a projector for projecting a shooting video image, in which at least a target appears, on a screen;

(b) shooting means for emitting a light beam, which is distinguishable from the video image, to the target on the screen;

(c) photographing means for photographing the screen;

(d) coordinate computing means for computing X and Y coordinates of a beam point of the light beam on the screen based on a picture signal from the photographing means;

(e) on-target discriminating means for collating the computed coordinates of the beam point with a displayed position of the target to output a on-target discrimination signal; and (f) the coordinate computing means including a pulse generator for outputting clock pulses, a counter for counting the clock pulses during a period from when a vertical synchronous signal of the picture signal is output until a beam point signal of said picture signal is output, an arithmetic part for dividing the count value by a predetermined reference pulse number to compute and output the X coordinate and the Y coordinate of the beam point on the screen.

Preferably the shooting game machine further comprises picture composing/computing means for causing the projector to display a mere impact image or an on-target impact image, based on said X and Y coordinates of the beam point or said on-target discrimination signal.

Further, the photographing means may include a light filter situated on a path of incident light for allowing the light beam to pass selectively.

In the shooting game machine of this invention, a shooting video image, in which a predetermined target appears, is projected on the screen by the projector.

The player fires the shooting means to emit a light beam to the target projected on the screen. At that time, the impact position of the light beam is projected on the screen as a light beam point.

The photographing means photographs the screen and outputs a picture signal to the coordinate computing means, irrespective of any screen scanning of the projector.

The coordinate computing means counts the clock pulses during a period from when a vertical synchronous signal of the picture signal is output until a beam point signal of the picture signal is output, and divides the count value by a predetermined reference pulse number to compute and output the X coordinate and the Y coordinate of the beam point on the screen.

The arithmetic part sets the number of pulses, which corresponds to a horizontal scanning time in the X direction of the picture signal output from the photographing means, as the reference pulse number and divides the count value output from the counter by the number of reference pulses, and outputs such quotient as the Y coordinate of the beam point and its residual as the X coordinate of the beam point.

Further, as the coordinates of the beam point of the light beam on the screen is computed by the coordinate computing means, the on-target discriminating means collates the computed coordinates of the beam point with the coordinates of the target to discriminate whether or not the light beam has hit the target. Based on this on-target discrimination signal or the coordinates of the beam point, the projector displays an on-target or mere impact image on the screen.

According to this invention, it is possible to compute the impact position of the beam point of the light beam in terms of the X and Y coordinates on the screen precisely, with no necessity of synchronizing the projector, for projecting a video image on the screen, with the photographing means for photographing the screen, which would have been the case according to the conventional art.

Therefore, partly since a complicated circuit for perfectly synchronizing the projector with the photographing means is not required, and partly since the impact position is located in terms of the X and Y coordinates to discriminate an on-target status, it is possible to make the whole machine simple in construction and low in cost.

Further, since it is free of any trouble resulting from the mis-synchronization between the projector and the photographing means, only simple maintenance is required to the whole machine so that this shooting game machine can be installed in, for example, an amusement center for a long duration.

DETAILED DESCRIPTION

A preferred embodiment of this invention will now be described in detail with reference to the accompanying drawings.

Figure 1:
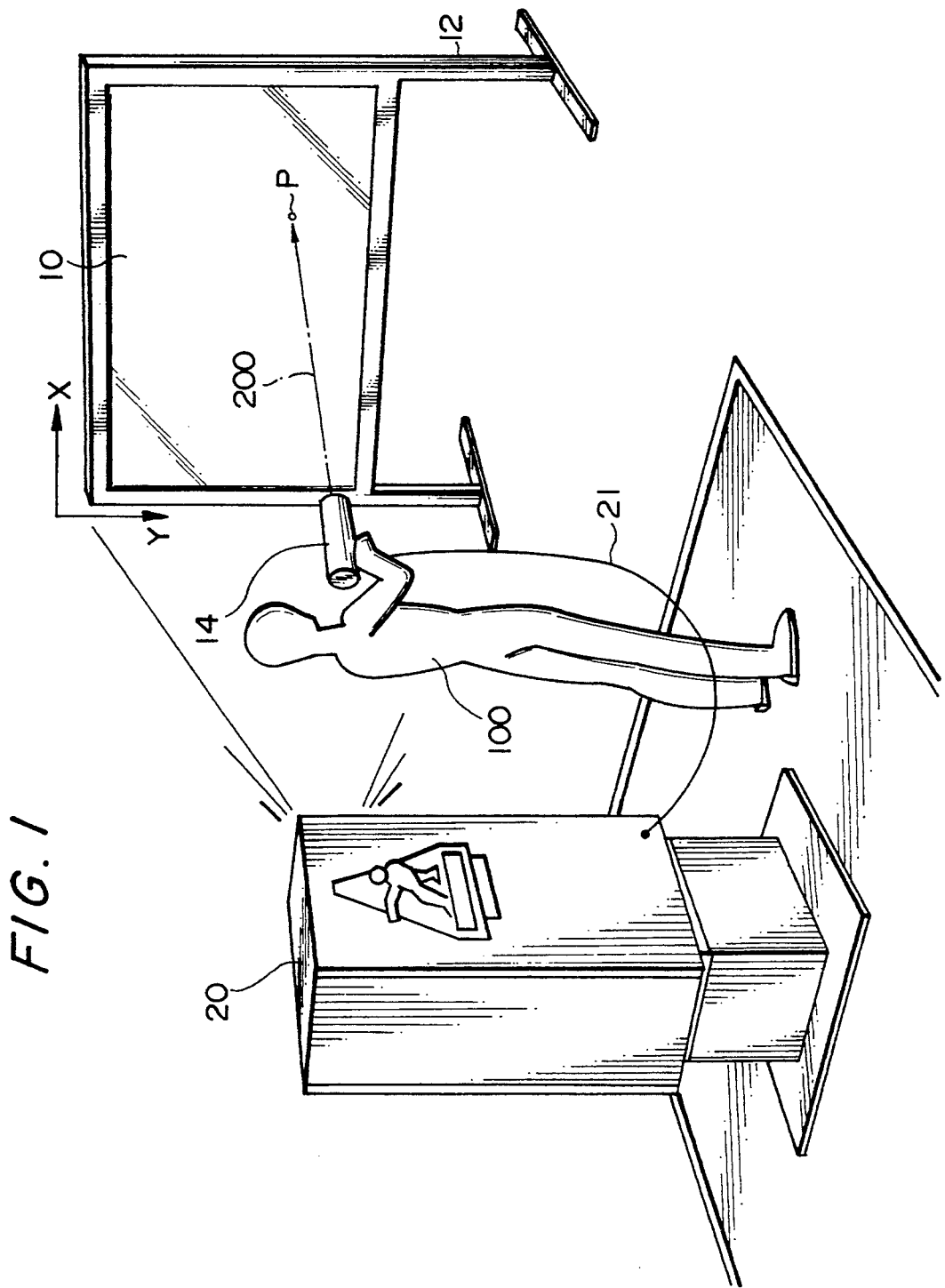
FIG. 1 is a perspective view schematically showing a shooting game machine embodying this invention.

FIG. 1 shows a shooting game machine according to one embodiment of this invention. The shooting game machine comprises a screen 10 installed upright by a stand 12, a game machine unit 20 in which a television projector (described below) for projecting a shooting video image, in which a predetermined target appears, on the screen 10, and a laser gun 14 for emitting a laser beam 200 to the screen 10 by the operation of the player 100.

The player 100 takes sight at one of targets successively appearing on the screen and fires the laser gun 14 to emit a laser beam 200.

At that time, the machine unit 20 detects the X and Y coordinates of the beam point P representing the impact position of the laser beam 200. The machine unit 20 collates the detected X and Y coordinates of the beam point P with the display position of the target to discriminate whether or not the laser beam 200 has hit the target. If the laser beam 200 has hit the target, an on-target impact image will be displayed on the screen 10. If the laser beam 200 has missed the target, a mere impact image of the laser beam 200 will be displayed on the screen.

The laser gun 14 is connected with the game machine unit 20 by a cord 21 to receive the laser generating power and various signals from the game machine unit 20.

Figure 2:
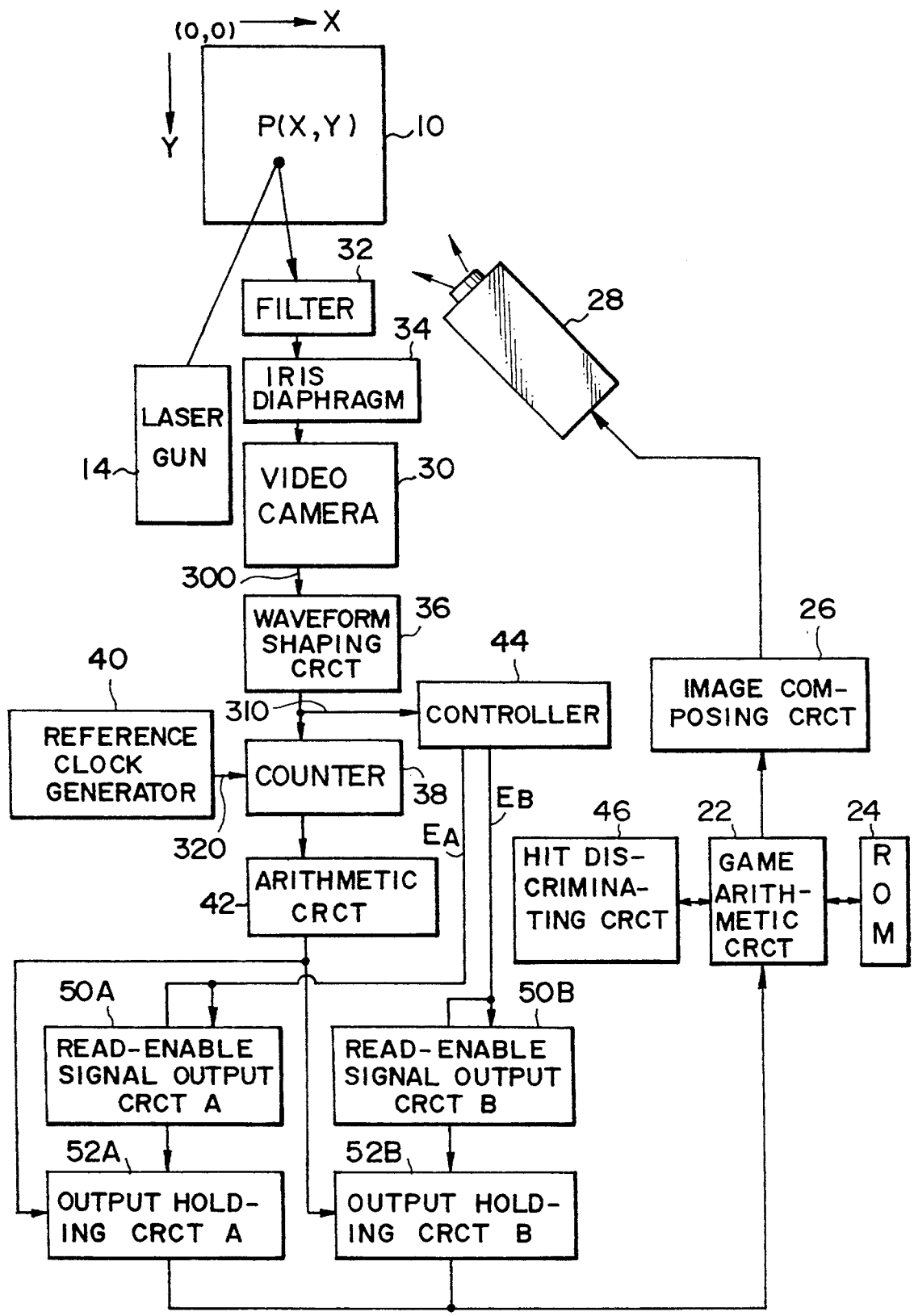
FIG. 2 is a block circuit diagram of a shooting game machine of the system.

FIG. 2 shows the circuit of the shooting game machine.

The shooting game machine comprises a game arithmetic circuit 22, a ROM 24 storing a predetermined program, an image composing circuit 26, and a television projector 28, which projects a predetermined shooting video image on the screen 10.

The game arithmetic circuit 22 performs an arithmetic operation for composing a predetermined game image, based on the game program stored in the ROM 24 and a signal input from a hit discriminating circuit (described below) 46, and outputs an arithmetic result signal to the image composing circuit 26. The image composing circuit 26 then composes a shooting video image, in which a predetermined target appears, according to the arithmetic operation signal; this video image is projected on the screen 10 using the television projector 28.

As shown in FIG. 1, the player 100 takes sight of the laser gun 14 at the target in the video image projected on the screen and sends out the laser beam 200. The beam point P of the laser beam 200 is thereby projected on the screen. The shooting game machine detects the impact position of this beam point P in terms of the X and Y coordinates with the origin (0, 0) at the upper left corner of the screen and with the X and Y axes in the horizontal and vertical directions, respectively.

More specifically, for detecting the beam point P of the laser beam 200 in this shooting game machine, the screen 10 is photographed using a video camera 30. The photographing range of the video camera 30 is set up so as to be substantially equal to the video image projecting range of the television projector 28. The video camera 30 is equipped with a filter 32 and an iris diaphragm 34. The filter 32 allows the laser beam 200 and light of its nearby band to pass selectively. The video camera 30 eliminates all noises of the video image via the filter 32 so that only the beam point P can be photographed selectively. The iris diaphragm 34 controls light input via the filter 32, cuts off small noise part of the power and further controls the beam point P to a suitable size to be input to the video camera 30.

Figure 3:
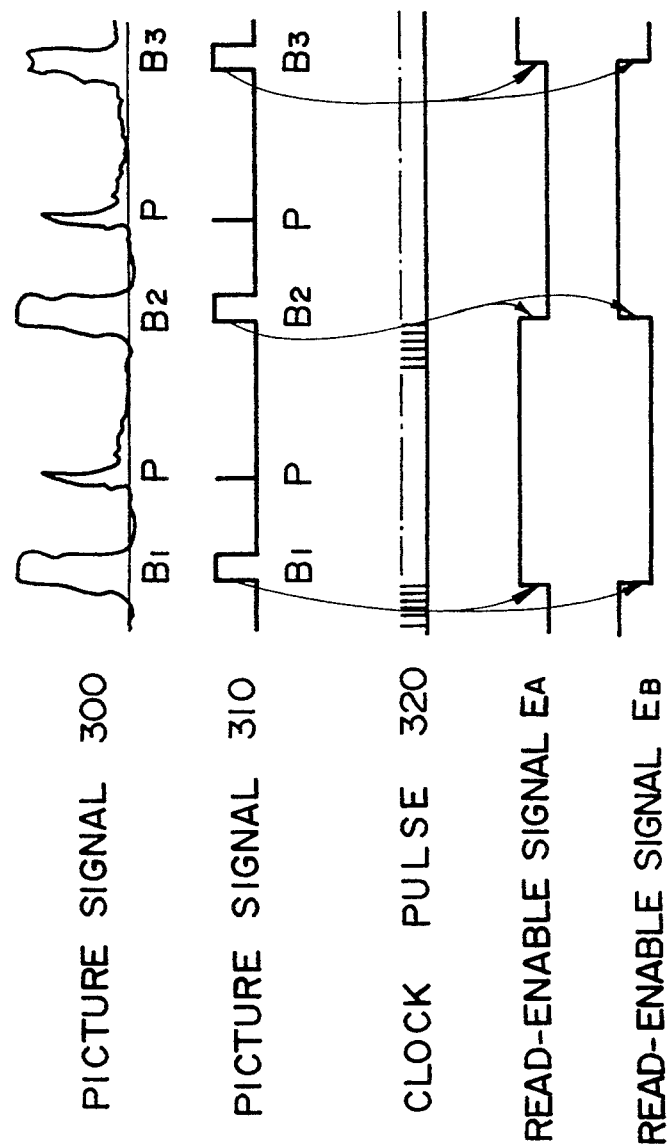
FIG. 3 is a timing diagram showing the operation of the circuit of FIG. 2.

FIG. 3 is a timing diagram of a picture signal 300 to be output from the video camera and a picture signal 310 to be output from a waveform shaping circuit 36. As shown in FIG. 3, the picture signal 300 to be output from the video camera 30 contains vertical synchronous signals B1, B2, . . . ; if the beam point P is projected on the screen 10, it also contains the beam point signal P. The waveform shaping circuit 36 shapes the picture signal 300 into a predetermined pulse waveform and outputs it to a counter circuit 38.

In the counter circuit 38, high-frequency clock pulses 320 are input from a reference clock generator 40.

In the counter circuit 38, every time the individual vertical synchronous signal B1, B2, B3, . . . is output from the waveform shaping circuit 36, the count value will be cleared at its rising. The counter circuit 38 starts the counting of the pulse signals 320 at the rising of every vertical synchronous signal B1 and stops the counting when the beam point P contained in the picture signal 310 is output. This procedure is performed for every screen field (1/60 second of screen field) in synchronism with the vertical synchronous signal B1, B2, B3, ..., and the count value is output to an arithmetic circuit 42 for every screen field.

Every time a count value is output from the counter circuit 38, the arithmetic circuit 42 divides the count value by a predetermined reference pulse number, and computes and outputs the X and Y coordinates of the beam point P on the screen 10. Specifically, the video camera 30 sets the number of pulses, which corresponds to the time (horizontal scanning time) required to scan the horizontal direction (direction of the X axis) of the image, as a reference pulse number and divides a count value, which is output from the counter circuit 38, by this reference pulse number. A quotient obtained at this time represents the Y coordinate of said beam point, and a residual represents the X coordinate of said beam point. Thus, the arithmetic circuit 42 computes and outputs the X and Y coordinates of the beam point based on the count value of the counter circuit 38.

For alternately writing and reading the thus computed and output X and Y coordinates of the beam point P, this machine is equipped with a controller 44, a pair of read-enable signal output circuits 50A, 50B, and a pair of output holding circuits 52A, 52B.

As shown in FIG. 3, the controller 44 controls the read-enable signal output circuits 50A, 50B in such a manner that read-enable signals $E_A$, $E_B$ are switched over to an "H" level and an "L" level in synchronism with the rising of the vertical synchronous signals B1, B2, B3 ... output from the waveform shaping circuit 36.

If the vertical synchronous signal B1 is output and the read-enable signal $E_B$ is set to an "L" level, the X and Y coordinates of the beam point P output from the arithmetic circuit 42 is stored in the output holding circuit 52B. Meanwhile, since the read-enable signal $E_A$ input to the other output holding circuit 52A is set to an "H" level, the X and Y coordinates of the beam point previously latched by the output holding circuit 52A is output to the game arithmetic circuit 22.

When the next vertical synchronous signal B2 is output, the "H" and "L" levels of the read-enable signals $E_A$, $E_B$ will be switched over each other. The X and Y coordinates of the beam point P output from the arithmetic circuit 42 in this screen field will thereby be latched by the output holding circuit 52A, meanwhile the X and Y coordinates of the beam point P previously latched by the other output holding circuit 52B will be output to the game arithmetic circuit 22. Thus, in this machine, the writing and reading of the X and Y coordinates of the beam point P to and from the output holding circuit 52A, 52B will be alternately performed.

The hit discriminating circuit 46 collates the X and Y coordinates of the beam point P input to the game arithmetic circuit 22 with the display coordinate region of the target output from the game arithmetic circuit 22 and discriminates whether or not the light beam 200 has hit the target. In other words, if the X and Y coordinates of the beam point P has been judged to have been located within a predetermined display area of the target, the hit discriminating circuit 46 will discriminate that the light beam 200 has hit the target, and will then output an on-target detection signal to the game arithmetic circuit 22.

Based on this on-target discrimination signal and the beam point coordinates, the game arithmetic circuit 22 will display the impact image on the screen, if the laser beam 200 has missed the target, and will control the television projector 28 and the image composing circuit 26 so as to display the on-target impact image of the target on the screen, if the laser beam 200 has hit the target.

In this embodiment, since the X and Y coordinates of the beam point P can be computed in a simple arithmetic operation for every field of the picture signal 300 output from the video camera 30, it is possible to make the whole circuit simple and inexpensive.

According to this shooting game machine, it is possible to discriminate whether or not the laser beam 200 has hit the target, without synchronizing the television projector 28 and the video camera 30.

This invention should by no means be limited to the foregoing embodiment, and various modifications may be suggested within the scope of the appended claims.

For example, although a single-player shooting game machine is described for the illustrated embodiment, this invention may be alternatively applied to a multi-player shooting game machine. In the multi-player shooting game machine, it should be controlled in such manner that the laser beams 200 from the respective laser guns 14 to be used by the plural players will be alternately output for every field so that the impact position of the laser beam 200 emitted from each player's gun can be detected precisely for each field.

As described above, according to this invention, since on-target discrimination can be made by detecting the impact position of the light beam precisely without synchronizing the projector with the photographing means, it is possible to make the whole game machine simple and inexpensive.

In particular, since it is unnecessary to synchronize the projector with the photographing means, there would occur no fault resulting from any mis-synchronization between the projector and the photographing means so that the shooting game machine is virtually free of fault for a long period of time, thus requiring only simple maintenance.

What is claimed is:
1. A shooting game machine comprising:
a projector projecting a shooting video image on a screen, the video image having a target;
shooting means for emitting a light beam toward the screen, the light beam distinguishable from said video image;
photographing means for photographing the screen and producing a picture signal;
coordinate computing means for computing X and Y coordinates of a beam point of said light beam on the screen based on the picture signal from said photographing means; and
on-target discriminating means for comparing the computed X and Y coordinates of the beam point with a displayed position of said target and for outputting an on-target discrimination signal,
wherein said coordinate computing means includes a pulse generator outputting clock pulses, a counter counting said clock pulses during a period from an output of a vertical synchronous signal of said picture signal until an output of a beam point signal of said picture signal and an arithmetic circuit di- viding a clock pulse count value of the counter by a predetermined reference pulse number to compute the X coordinate and the Y coordinate of said beam point on the screen.

2. The shooting game machine of claim 1, further comprising picture composing means for forming a composite video image comprising at least one of a mere impact image and an on-target impact image, based on at least one of said X and Y coordinates of said beam point and said on-target discrimination signal, the protector displaying the composite video image as the shooting video image.

3. The shooting game machine of claim 2, wherein said picture composing means includes:
a memory storing a predetermined game program;
a game arithmetic circuit performing a predetermined game operation based on said game program stored in said memory and the output of said on-target discriminating means, the arithmetic circuit outputting a game video image composing signal; and
an image composing circuit composing the composite video image based on an arithmetic signal output from said game arithmetic circuit, and outputting a picture signal corresponding to the composite video image to said projector.

4. The shooting game machine of claim 2, further comprising:
a plurality of read-enable signal output circuits outputting read-enable signals;
a plurality of output holding circuits controlling an input and an output of data based on said read-enable signals output from said read-enable output circuits; and
a controller controlling said read-enable signals output from said read-enable signal output circuits to alternately switch to an "H" level and an "L" level in synchronism with said vertical synchronous signal contained in said picture signal output from said photographing means,
wherein one of said plurality of output holding circuits stores the X and Y coordinates of said beam point output from said coordinate computing means when a corresponding one of the plurality of read-enable signals is set to the "L" level, and outputs the stored X and Y coordinates of said beam point to said picture composing means when the corresponding read-enable signal is set to the "H" level.

5. The shooting game machine of claim 2, wherein said coordinate computing means computes an impact position of said beam point on the screen based on the X and Y coordinates of the beam point on the screen with an origin located at an upper left corner of the screen, and with X and Y axes positioned along horizontal and vertical directions, respectively.

6. The shooting game machine of claim 5, wherein said arithmetic circuit sets the predetermined reference pulse number based on a horizontal scanning time in the X direction of said picture signal, the arithmetic circuit further divides said clock pulse count value output from said counter by said predetermined reference pulse number, and outputs a quotient as the Y coordinate of said beam point and a residual as the X coordinate of said beam point.

7. The shooting game machine of claim 2, wherein said photographing means includes a video camera having a camera range set to substantially coincide with a projection range of said video image on the screen.

8. The shooting game machine of claim 7, wherein said photographing means includes a waveform shaping circuit shaping said picture signal, into a pulse waveform, having vertical synchronizing and beam point signals output as pulse waveforms.

9. The shooting game machine of claim 8, wherein said photographing means further includes a light filter situated on a path of incident light allowing said light beam to pass selectively to said video camera.

10. The shooting game machine of claim 9, wherein said coordinate computing means computes an impact position of said beam point on the screen based on the X and Y coordinates of the beam point on the screen with an origin located at an upper left corner of the screen, and with X and Y axes positioned along horizontal and vertical directions, respectively.

11. The shooting game machine of claim 10, wherein said arithmetic circuit sets the predetermined reference pulse number based on a horizontal scanning time in the X direction of said picture signal and divides said clock pulse count value output from said counter by said predetermined reference pulse number, and outputs a quotient as the Y coordinate of said beam point and a residual as the X coordinate of said beam point.

12. The shooting game machine of claim 9, wherein said photographing means further includes an iris diaphragm controlling a size of said beam point on the screen.

13. The shooting game machine of claim 12, wherein said coordinate computing means computes an impact position of said beam point on the screen based on the X and Y coordinates of the beam point on the screen with an origin located at an upper left corner of the screen, and with the X and Y axes positioned along horizontal and vertical directions, respectively.

14. The shooting game machine of claim 13, wherein said arithmetic circuit sets the predetermined reference pulse number based on a horizontal scanning time in the X direction of said picture signal and divides said clock pulse count value output from said counter by said predetermined reference pulse number, and outputs quotient as the Y coordinate of said beam point and residual as the X coordinate of said beam point.

15. The shooting game machine according to claim 1, wherein said photographing means includes a video camera having a camera range set to substantially coincide with a projection range of said video image on the screen.

16. The shooting game machine of claim 15, wherein said photographing means includes a waveform shaping circuit shaping said picture signal, into a pulse waveform, having vertical synchronizing and beam point signals output as pulse waveforms.

17. The shooting game machine of claim 1, wherein said coordinate computing means computes an impact position of said beam point on the screen based on the X and Y coordinates of the beam point on the screen with an origin located at an upper left corner of the screen, and with X and Y axes positioned along horizontal and vertical directions, respectively.

18. The shooting game machine of claim 17, wherein said arithmetic circuit sets the predetermined reference pulse number based on a horizontal scanning time in the X direction of said picture signal, the arithmetic circuit further divides said clock pulse count value output from said counter by said predetermined reference pulse number, and outputs a quotient as the Y coordinate of said beam point and a residual as the X coordinate of said beam point.

19. The shooting game machine of claim 1, wherein said on-target discriminating means determines that said light beam has hit said target if the computed X and Y coordinates of said beam point are located within a predetermined display area of said target.

20. The shooting game machine of claim 1, further comprising a plurality of shooting means, wherein each of said plurality of shooting means emits a corresponding light beam to said video image projected from said projector, said coordinate computing means computes the X and Y coordinates of a beam point corresponding to said light beam, and said on-target discriminating means compares the coordinates of each beam point with the displayed position of said target and determines whether the corresponding light beam hits said target.

* * * * *